United States Patent

[11] 3,598,296

| [72] | Inventor | Frank T. Gostomski |
| | | Wahoo, Nebr. 68066 |
| [21] | Appl. No. | 823,633 |
| [22] | Filed | May 12, 1969 |
| [45] | Patented | Aug. 10, 1971 |

[54] UNIVERSAL WHEEL CARRIER APPARATUS
9 Claims, 5 Drawing Figs.

[52] U.S. Cl. ................................................ 224/42.06, 224/42.21, 214/454
[51] Int. Cl. ....................................................... B62d 43/02
[50] Field of Search ............................................ 224/42.06, 42.03, 42.04, 42.12, 42.21, 42.08; 214/451, 454

[56] References Cited
UNITED STATES PATENTS

| 1,866,013 | 7/1932 | Coquille ................... | 224/42.21 X |
| 1,926,350 | 9/1933 | Olson ........................ | 224/42.21 |
| 2,779,524 | 1/1957 | Carlson ..................... | 224/42.08 |
| 3,343,736 | 9/1967 | Sellers ...................... | 224/42.06 |

*Primary Examiner*—Robert G. Sheridan
*Attorney*—Henderson & Strom

ABSTRACT: This invention relates to an apparatus for mounting a spare tire and wheel to the bumper of a vehicle, the apparatus comprising a shaft extending substantially parallel to the bumper and rotatably mounted to a pair of spaced apart mounting members, the members having a concave surface, thus being adapted to be fastened to the bumper; a support arm axially connected to the shaft and extending therefrom; a lock pin connected to the extended end of the arm and extending outwardly from the vehicle to lock the wheel; a bolt device for removably mounting the wheel to the arm, and a device reciprocally attached to the mounting members for maintaining the arm in a fixed position.

PATENTED AUG 10 1971　　3,598,296
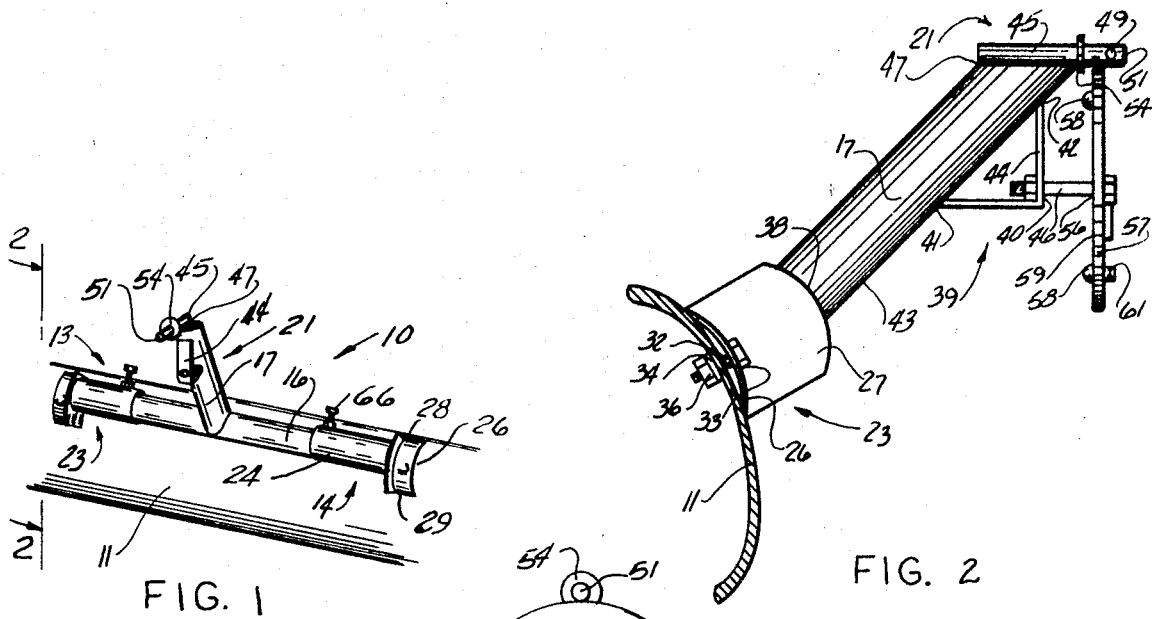
FIG. 1
FIG. 2
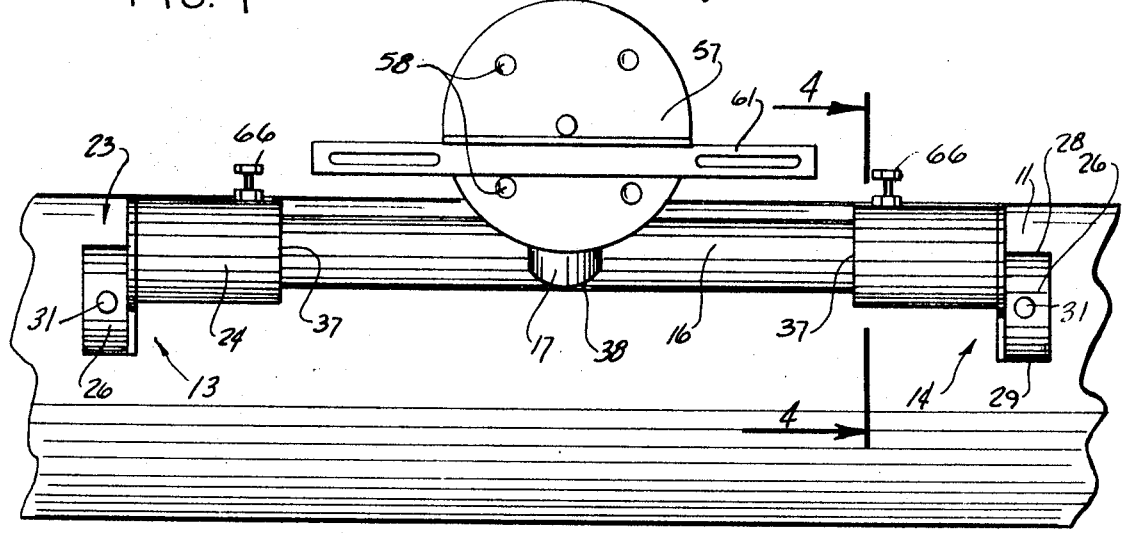
FIG. 3
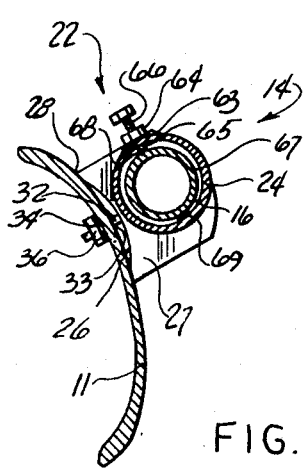
FIG. 4
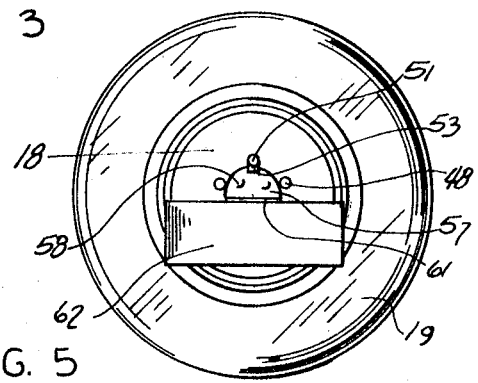
FIG. 5
INVENTOR.
FRANK T. GOSTOMSKI
BY
Henderson & Strom
ATTORNEYS

UNIVERSAL WHEEL CARRIER APPARATUS

BACKGROUND OF THE INVENTION

This invention relates generally to a wheel carrier, and particularly to a wheel carrier adaptable for mounting a spare wheel and tire to the bumper of a vehicle.

The manufacturer's placement of the spare wheel in many of the vehicles presently available proves to be inconvenient or wholly unacceptable when the vehicle is used for a special purpose. This inconvenience is particularly noticeable in vehicles of the pickup truck variety where the spare wheel placement can interfere with the placement of a wide load, or can prohibit the placement of an enclosure over the truck load bed. Further, when a camper or the like is placed on a pickup truck, the spare wheel is inaccessible when positioned under the load bed, as the camper usually overhangs the rearward end of the load bed.

Prior art relating to exterior spare wheel carriers is concerned with placement of the wheel at the rear of the vehicle adjacent the body or tailgate of the vehicle, which carriers mount directly to the extended frame or body of the vehicle. Such placement is impractical since modern vehicles do not have extended frames and a camper or the like extends rearwardly of the body of the vehicle.

The bumper of the vehicle is the sturdiest and most extended portion of the vehicle, and therefore is ideal for mounting a spare wheel carrier. However, the bumpers of various manufacturers assume various contours and shapes, thereby generally requiring a different wheel carrier mounting for each make and model vehicle. Since some bumpers are substantially flat while others are of a curved contour, a spare wheel carrier adaptable to mount all shapes of bumpers has not been known hereinbefore. The wheel carrier apparatus of this invention is adapted to mount to all commonly known vehicle bumpers.

SUMMARY OF THE INVENTION

The invention relates to a spare wheel carrier adaptable for mounting to a conventional vehicle, the carrier comprising a pair of spaced and aligned journal members mounted to the vehicle; a rotatable shaft extended between and mounted to the members; a support arm axially connected to the shaft and extended therefrom; a device connected to the housing members and reciprocally engageable with the shaft to maintain the shaft and extended arm in a predetermined position; and means for removably mounting a wheel to the support arm.

It is an object of this invention to provide a novel wheel carrier apparatus adaptable for mounting to a vehicle.

It is another object of this invention to provide a wheel carrier apparatus for mounting a wheel and tire to any conventional vehicle bumper.

It is yet another object of this invention to provide a mounting bracket for fastening a wheel carrier to the surface of a vehicle bumper regardless of the contour of the bumper and wherein the mounting brackets are contoured to grip the bumper without slippage.

It is still another object of this invention to provide a wheel carrier for mounting a tire and wheel to the front of a vehicle and which is pivotal to provide easy access to the power source of the vehicle.

It is a further object of this invention to provide a wheel carrier which will mount a wheel and tire to a vehicle with the wheel and tire being positionable in a selective plane relative to the ground.

It is another object of this invention to provide a lock mechanism for securing a spare wheel to a wheel carrier.

It is yet another object to provide a wheel carrier which can be removably mounted to a vehicle.

It is still another object to provide a wheel carrier which is capable of fulfilling the hereinbefore described objects, yet is simple to use, economical to manufacture, and rugged in construction.

These objects and other features and advantages of the wheel carrier of this invention will become readily apparent upon reference to the following description when taken in conjunction with the accompanying drawings.

BRIEF DESCRIPTION OF THE DRAWINGS

FIG. 1 is a perspective view of the wheel carrier apparatus of this invention attached to a bumper of a vehicle, with certain parts broken away for clarity of illustration;

FIG. 2 is a sectional view as taken along the line 2-2 of FIG. 1;

FIG. 3 is a front elevational view;

FIG. 4 is a sectional view as taken along the line 4-4 of FIG. 3; and

FIG. 5 is a fragmentary front view showing a wheel and tire mounted to the apparatus.

DESCRIPTION OF THE PREFERRED EMBODIMENT

Referring now to the drawings and particularly to FIG. 1, the wheel carrier apparatus of this invention is indicated generally by the numeral 10, and is shown mounted to a bumper 11 of a conventional vehicle.

The wheel carrier apparatus 10 includes generally a pair of aligned and spaced apart journal members 13 and 14 mounted to the bumper 11, and a rotatable shaft 16 extended between and mounted to the journal members 13 and 14. A support arm 17 is axially connected to the shaft 16 between the members 13 and 14 and extended from the shaft 16 for supporting a wheel 18 (FIG. 5) and tire 19 removably mounted thereto by mounting means 21 (FIG. 1) connected to the arm 17. The wheel carrier apparatus 10 is further provided with a screw device 22 connected to the journal members 13 and 14 for engaging the shaft 16 to maintain the shaft 16 and arm 17 in a fixed selective or predetermined position.

The journal member 13 (FIGS. 1—4) is a mirror image of the journal member 14, therefore only one member 14 will be described. The journal member 14 includes generally a mounting bracket 23 and a cylindrical housing 24. The mounting bracket 23 comprises a concave portion 26 adapted to connect to the bumper 11, and a flat portion 27 extended away from the bumper 11 to connect the housing 24 to the bracket 23.

The concave portion 26 (FIGS. 1 and 4) has a pair of edges 28 and 29 adapted to contiguously engage the bumper 11. A hole 31 is centrally formed in the concave portion 26 to receive a bolt 32, which bolt 32 is inserted through a hole 33 formed in the bumper 11 and is appropriately secured to the bumper by a washer 34 and nut 36. The members 13 and 14 are aligned to receive the shaft 16, as hereinafter described, and the bolt is tightened to enable the edges 28, 29 to securely grip the bumper 11.

The cylindrical housing 24 (FIGS. 1 and 4) is axially connected, as by welding, to the flat portion 27 of the brackets 23 and extends substantially parallel to the bumper 11. The end 37 of the housing 24 distal to the connected bracket 23 is open to axially receive a rotatable shaft 16. The shaft 16, of steel tubing or the like, is extended axially between the journal members 13 and 14 and is rotatably mounted within the housings 24 thereof.

Attached axially to the shaft 16 (FIGS. 1 and 3) substantially midway between the journal members 13 and 14 is the support arm 17. The arm 17 is constructed of a steel tube or the like and is connected at one end 38 to the shaft 16 with the axis thereof extending normal to the axis of the shaft 16. The arm 17 is normally disposed in a vertically inclined position relative to the ground, as hereinafter described.

An L-shaped strap 39 (FIG. 2), of steel or the like, is attached as by welding, at its ends 41 and 42 to the forward arm wall 43 distal to the vehicle. A hole 40 is formed and tapped in the upright leg 44 of the strap 39 to receive a bolt 46, as hereinafter described, for removably mounting the wheel 18 (FIG. 5).

The mounting means 21 includes generally an elongated pin 45 attached to the extended end 47 of the support arm 17 and is extended substantially horizontally away from the vehicle. The pin 45 has a hole 49 bored radially therethrough proximate the extended end 51 thereof for the purpose of receiving a hasp or the like. A stopper washer 54 is positioned on the pin 45 between the hasp 52 and the wheel 18.

The mounting means further includes a bolt 46 (FIGS. 2 and 5) inserted through a hole 56 centrally formed in a disc 57 and inserted through the hub of the wheel 18, which bolt 46 is then secured to the L-shaped strap 39. The disc 57 is adapted to overlap the hub of the wheel 18 and clamp the wheel 18 to the support arm 17 when the bolt 46 is tightened. A plurality of radially spaced projections 58 are formed on the backside 59 of the disc 57 to facilitate centering the wheel 18 relative to the axis of the bolt 46. A license plate holder 61 may be attached, as by welding, to the disc 57 to hold and exhibit the license plate 62.

The screw device 22 (FIG. 4) is connected to the journal members 13 and 14 and is provided to maintain the shaft 16, arm 17 and wheel 18 in a predetermined position. The device 22 includes a hole 65 radially formed in the wall 63 of the housing 24 and an axially aligned nut 64 attached, as by welding, to the wall 63 of the housing 24 immediately adjacent the hole 62. A bolt 66 is axially threaded through the hole 62 and nut 64 to reciprocally engage the wall 67 of the shaft 16 mounted in the housing 24. Tightening of the bolt 66 acts to clamp the shaft 16 between the bolt end 68 and the inner peripheral wall 69 of the housing 24 and prevent rotation of the shaft 16 within the housing 24. Conversely, when access to the area of the vehicle immediately behind the wheel 18 is desired, the bolt 66 may be loosened to permit the wheel 18 to pivot away from the vehicle.

To mount and use the wheel carrier 10 of this invention, the journal member 13 is attached to the bumper 11, and the shaft 16, with the arm 17 connected thereto, is journaled in the housing 24. The second journal member 14 is then mounted to the shaft 16 and attached to the bumper 11. The members 13 and 14 are coaxially aligned with the shaft 16 and securely fastened to the bumper 11. The arm 17 is then rotated to a vertically inclined position wherein the lockpin 45 assumes a substantially horizontal position and the bolts 66 are tightened to securely fix the arm 17 in the selected position. The wheel 18 is positioned with a lug-receiving hole 48 aligned with the lock pin 45 and is pushed toward the vehicle to extend the pin 45 through the hole 48. The disc 57 is then juxtapositioned against the wheel 18 and overlaps the hub thereof, the bolt 46 is inserted through the disc 57 and wheel 18 and secured to the L-shaped strap 39 of the arm 17 and tightened to clamp the wheel 18 to the arm 17. The hasp of a padlock may be inserted through the diametric hole 49 formed in the lock pin 45 to lock the wheel 18 to the arm 17.

Though a preferred embodiment of a wheel carrier apparatus has been hereinbefore described for illustration purposes, it is to be remembered that suitable modifications and equivalents may be contemplated without departing from the invention as claimed.

I claim:

1. A wheel carrier apparatus for mounting a wheel to a vehicle, the apparatus comprising:
   a pair of spaced and aligned journal members attached to the vehicle, wherein each said journal member includes a bracket having a concave portion adapted to contiguously engage the vehicle, and a cylindrical housing connected to said bracket, said housing extending parallel to the engaged surface of the vehicle; a shaft extended axially between said members and rotatably mounted thereto;
   a support arm having one end thereof axially connected to said shaft between said members;
   means connected to said journal members and engageable with said shaft for maintaining said arm in a predetermined position; and
   mounting means coactable with the wheel, said mounting means connectable to said arms for removably mounting the wheel to said arm.

2. A wheel carrier apparatus as defined in claim 1 and further wherein at least two edges of said concave portion engage the vehicle.

3. A wheel carrier apparatus as defined in claim 1 wherein said shaft is journaled in said housing.

4. A wheel carrier apparatus as defined in claim 3 wherein said support arm includes an L-shaped strap positioned forwardly thereof, said strap including an upright leg having a hole formed therein for receiving a bolt.

5. A wheel carrier apparatus as defined in claim 4 wherein said arm maintaining means includes a pair of bolts, each bolt reciprocally secured to said housing, and extending radially through a hole formed in the wall of said housing to engage said shaft and prevent said shaft from rotating.

6. A wheel carrier apparatus as defined in claim 5 wherein said mounting means includes a disc juxtapositioned against the wheel and a bolt extending through said disc and wheel and secured to said strap.

7. A wheel carrier apparatus as defined in claim 6 wherein said disc includes a plurality of radially spaced, inwardly extending projections to center the wheel relative to the axis of said bolt.

8. A wheel carrier apparatus as defined in claim 7 wherein said disc includes a license plate holder.

9. A wheel carrier apparatus as defined in claim 6 and further wherein said mounting means includes a lockpin attached to said arm, said pin extending outwardly for insertion through a lug-receiving hole of the wheel, said lockpin having a diametric hole formed adjacent the extended end thereof.